United States Patent
Stewart

(10) Patent No.: US 10,104,843 B2
(45) Date of Patent: Oct. 23, 2018

(54) SELF-WATERING PORTABLE GREENHOUSE

(71) Applicant: Michael A. Stewart, Jackson, MS (US)

(72) Inventor: Michael A. Stewart, Jackson, MS (US)

( * ) Notice: Subject to any disclaimer, the term of this patent is extended or adjusted under 35 U.S.C. 154(b) by 432 days.

(21) Appl. No.: 15/055,256

(22) Filed: Feb. 26, 2016

(65) Prior Publication Data
US 2017/0245442 A1 Aug. 31, 2017

(51) Int. Cl.
*A01G 9/00* (2018.01)
*A01G 9/16* (2006.01)
*A01G 27/00* (2006.01)
*A01G 9/14* (2006.01)
*A01G 9/24* (2006.01)

(52) U.S. Cl.
CPC .............. *A01G 9/16* (2013.01); *A01G 9/1438* (2013.01); *A01G 9/247* (2013.01); *A01G 27/005* (2013.01); *A01G 27/006* (2013.01); *A01G 27/008* (2013.01); *A01G 2009/1446* (2013.01); *A01G 2009/1484* (2013.01)

(58) Field of Classification Search
CPC .......... A01G 9/14; A01G 9/16; A01G 27/005; A01G 27/006; A01G 27/008
See application file for complete search history.

(56) References Cited

U.S. PATENT DOCUMENTS

| | | | |
|---|---|---|---|
| 3,106,801 A | 10/1963 | Risacher | |
| 3,534,498 A | 10/1970 | Herrli | |
| 4,117,632 A | 10/1978 | Pearce | |
| 4,339,891 A | 7/1982 | Bassett | |
| 4,546,571 A | 10/1985 | Scriens | |
| 4,557,071 A | 12/1985 | Fah | |
| 6,357,179 B1 | 3/2002 | Buss | |
| 6,622,425 B2 | 9/2003 | Shepherd | |
| 6,880,484 B1 | 4/2005 | Lee | |
| 7,036,270 B1 | 5/2006 | Shepherd | |
| 7,765,736 B1 | 8/2010 | Lloyd | |
| 8,448,380 B1 | 5/2013 | Yang | |
| 8,453,381 B2 | 6/2013 | Porter | |
| 9,108,212 B2 | 8/2015 | Yeiser, IV | |
| 9,161,500 B2 | 10/2015 | Hansen | |
| 9,241,452 B2 | 1/2016 | Stewart, Jr. | |
| 2002/0059749 A1* | 5/2002 | Williams | A01G 9/16 47/17 |
| 2002/0088171 A1* | 7/2002 | Shepherd | A01G 9/028 47/17 |
| 2004/0035466 A1 | 2/2004 | Oretti | |
| 2006/0150506 A1 | 7/2006 | Lee | |
| 2009/0056219 A1 | 3/2009 | Csoke | |
| 2010/0236142 A1* | 9/2010 | Drewry | A01G 9/16 47/29.1 |
| 2010/0275512 A1* | 11/2010 | Nien | A01G 9/16 47/66.7 |
| 2011/0036006 A1 | 2/2011 | Griebel | |

(Continued)

*Primary Examiner* — Monica L Williams
*Assistant Examiner* — Aaron M Rodziwicz
(74) *Attorney, Agent, or Firm* — Steve C. Thornton

(57) ABSTRACT

A self-watering portable greenhouse is disclosed having a tubular frame constructed of light-weight, water-tight tubular members which serves as a combined structural skeleton for external walls, a platform for plant containers, and a reservoir for liquid nutrients provided to plants in plant containers by self-watering through a wick connecting the reservoir and the plant containers.

11 Claims, 6 Drawing Sheets

(56) References Cited

U.S. PATENT DOCUMENTS

2013/0047507 A1 2/2013 Tinapple
2014/0338259 A1 11/2014 Nilsson et al.
2017/0112075 A1* 4/2017 DeMerchant, Jr. ...... A01G 9/16

* cited by examiner

SELF-WATERING PORTABLE GREENHOUSE

TECHNICAL FIELD OF THE INVENTION

The present invention relates to portable green houses and self-watering systems for potted plants and more particularly to an improved portable greenhouse having a tubular frame that serves as a combined structural skeleton for external walls, a platform for plant containers, and a reservoir for liquid nutrients provided to plants in plant containers by self-watering through a wick connecting the reservoir and the plant containers.

BACKGROUND OF THE INVENTION

Apparatuses that facilitate growing plants in confined spaces provide means for persons who live in limited space arrangements, such as apartments, condominiums, and other similar urban environments, to enjoy the benefits of plant life. As plants grow, they produce by photosynthesis oxygen, which provides sustenance for humans, animals and other living organisms. Also, plant life serves as food for animals, humans and a wide variety of other creatures and organisms; and plant life can be used, processed, or otherwise modified to form a multiplicity of products. However, special challenges are presented when one attempts to grow plants in confined spaces. Recent interest in growing plants in apartments, home patios, and similar confined spaces has brought new emphasis on overcoming these challenges.

A variety of pots and trays for growing plants in restricted spaces are known in the art. For example, U.S. Pat. No. 3,106,801 discloses a tray for containing soil, a heating element for temperature control, and a transparent covering, all combined to constitute a portable greenhouse. However, the portable greenhouse does not contain a source of water for the plants grown therein. Adequate space for appropriate volumes of liquid nutrients necessary to plant growth is one of the major challenges to growing plants in confined spaces.

An additional challenge for growing plant in confined spaces is the strict timing requirements for providing liquid nutrients to the growing plants. A great variety of plant species have been grown in confined spaces. Species vary in the extent of care and attention required to maintain them in a healthy condition. The feeding of plants with necessary liquid nutrients requires repeated additions at intervals specific to the demands of each type plant. For successful growth of plant life, the supply of an appropriate amount of liquid nutrients during growth and the effective distribution of that liquid to the plant roots are essential. In the growing of plants, there is a need to provide liquid nutrients to the root system of a plant in a controlled manner, on a substantially continuous basis, and in correct amounts. This allows the particular plant to feed itself as needed, without the damaging effects of over-watering. The most significant problem in tending to potted plants is watering and feeding them. Generally, a caretaker must tend to each potted plant individually, determining when and how much water and food to provide to each plant. Plants of different types may require different amounts of water or water at different intervals. Whether of the same or a different type, plants located in sunny versus shaded areas or located in different types or sizes of pots may all have different water requirements. Thus, a caretaker may need to tend various plants on an everyday basis, watering and/or feeding different plants on different days. These requirements would thus limit persons who wanted to leave their potted plants in their home or apartment for a period of time, such as for a vacation. Such persons would have to find another party to tend to the plants.

Conventionally, watering plants is accomplished by pouring water from above onto the plant and surrounding soil. Using this method, such watering must be done at regular intervals to maintain the health of a plant being grown, and those intervals are determined by the type of plant being grown and other environmental considerations. Too little water and too much water at particular time intervals of a plant's growth cycle can each be detrimental to a plant's growth and health. Typically, a conventional planting pot includes a floor having a centrally located aperture, which serves as a drain hole when the plant has been over watered. Draining through the bottom of the pot is wasteful and can be a nuisance, such as when water drains from the deck of an upper apartment to an apartment below. It is typical for such a planting pot to be placed on the interior of a larger outer container or pot to contain excess watering liquid that the potting soil cannot contain. The result from this configuration sometimes leads to an over-watering which can virtually drown and kill the plant, or result in root rot, which will have the same effect due to water accumulating in the container or pot. Such conventional watering methods often require daily attention to check soil moisture and water as needed. It is also common for under and over-watering to occur when the plants are not checked often enough.

Bottom watering (also called self-watering) is an alternative method for providing sufficient liquid nutrients during plant growth that aims to avoid the disadvantages associated with conventional watering techniques. Bottom watering is accomplished by placing water at or around the bottom of a plant container (in some form of container for the water) in limited contact with the soil of the plant container in such a manner that facilitates water penetration into the soil but also prevents the soil from being washed out of the plant container. Self-watering systems for plant growth require a source providing water to the plant container, they require a mechanism for distributing water from the water source to the plant roots; and they require that such water source provide only the volume of water needed by the plant. Often, self-watering systems rely on migration of the water into the soil by means of a wick that facilitates capillary migration of the water from its container through the wick and into the soil in the plant container. Adhesion of the particles of water to the particles of the wick produces capillary migration of the water from its container through the wick and into the soil.

Self-watering plant containers are known to offer several advantages over conventional plant containers that require top watering. For example, with bottom watering there is less water lost to the surrounding air due to evaporation than occurs in conventional watering. Therefore less water is required to maintain the desired soil moisture levels in the soil. Also, with bottom watering there is less run-off of fertilizers and other soil treatments relative to top watering, resulting in a greater retention of fertilizers and other treatments. Additionally, self-watering plant containers give growers more flexibility in scheduling the addition of water to a bottom container than the grower would have with conventionally watered plant containers. With conventional plant containers watered from the top, the moisture content of the soil in the plant container will be higher immediately after water is added, and it will gradually reduce as the plant absorbs liquid nutrients from the soil. In these circumstances, a grower must closely monitor the moisture content of the soil in the plant container and carefully time the additions of water. Water added at too often may result in over-watering, while water added too seldom may result in under-watering. By comparison, reservoirs in self-watering containers provide a steady source of moisture to the soil in the container. The reservoir thus frees growers from the stricture of such close observation of the moisture of the soil in the plant container, thereby giving growers more flexibility in the timing of adding water to the reservoir vis-a-vis pouring water on top of the plant and surrounding soil at more time-sensitive intervals.

Various systems have been proposed to allow bottom watering of plants grown in confined spaces. For example, U.S. Pat. No. 4,117,632 discloses a self-watering system for a potted plant that includes a small liquid container fitted below and connected to a plant container. An insert is provided with a wick for transporting liquid from the liquid container up into the lower part of the plant container. The wick extends from the liquid container through the insert into the plant container and is then wound around the upper part of the insert (surrounded by soil inside the plant container), thus providing a long transport path for capillary-migration of water from the liquid container into the surrounding soil in the plant container.

U.S. Pat. No. 3,534,498 discloses a self-watering system for a potted plant that includes a plant container concentrically fitted inside a larger container. The larger container houses two separate liquid reservoirs, a lower reservoir in the bottom area of the larger container and an upper reservoir placed in the circumferential space between the walls of the two containers near the top of the two containers. The plant container is connected to the lower reservoir via holes in the plant container, and a wick provides capillary migration of water from the lower reservoir into the plant container. The upper reservoir is connected to the lower reservoir by means of a connecting tube. When the water level in the lower reservoir drops below the lower end of the connecting tube, water flows under gravity from the upper reservoir into the lower reservoir, as water in the upper reservoir is displaced by air until the water level in the lower reservoir rises to cover the end of the connecting tube. At that point, atmospheric pressure on the surface of the water in the lower reservoir holds up the column of water in the connecting tube and prevents further flow from the upper reservoir.

U.S. Pat. No. 6,622,425 provides yet a third example. It discloses a portable greenhouse having a tub (or pan) sized to contain several plant containers and further suited to hold some water in the tub beneath the plant containers. The volume of water held by the tub is relatively small and limited by portability considerations.

There exists a need for a portable greenhouse that includes a self-watering system that can overcome the problems of the currently known self-watering systems, and further includes a self-contained reservoir of sufficient size to provide a source of water to self-water the plants in the greenhouse for an extended period.

SUMMARY OF THE INVENTION

Accordingly, it is an aspect of the present invention to provide a portable greenhouse constructed of light-weight materials, sized for use in confined spaces, such as a sun room or patio of a home or apartment, having a means of self-watering plants in the greenhouse. An additional aspect of the present invention is to provide a portable greenhouse having a reservoir of substantial volume to provide liquid nutrients to the plants in the greenhouse, and thereby to give growers more flexibility in timing required additions of water. A water level indicator of the present invention informs growers when it may be necessary to add water to the reservoir. It is a further aspect of the present invention to utilize the structural parts of the reservoir in the dual role as structural skeleton to support walls of the greenhouse. Further aspects of the present invention include providing a portable greenhouse that reduces the watering requirements by reducing evaporation, that reduces the waste of liquid nutrients by eliminating water run-off, and that increases plant health by providing liquid nutrients directly to the roots of plants and by timing the delivery of those nutrients to coincide with the specific demands of the plants being grown.

These and other aspects of the present invention are accomplished by using light-weight, water-tight tubular members to form a frame that constitutes, in combination, a two-part reservoir, a platform for plant containers, a housing for wicks, and a structural skeleton for exterior walls of a greenhouse. While other systems in the art have used tubular piping to deliver liquid nutrients to and from plants, none have utilized tubular piping for the combined functions of the present invention.

In the present invention, water-tight tubular members are connected to form a frame. The frame provides a structural skeleton to which external walls of the greenhouse may be attached. In the preferred embodiment, the frame is constructed into two compartments—a lower compartment and an upper compartment. Each of the separate compartments forms a separate reservoir (a lower reservoir and an upper reservoir) for water or similar liquid that can be used as source of liquid nutrients for plants. The two reservoirs are connected by a float valve that regulates water flow from the upper reservoir into the lower reservoir. Thus, the entire frame of the greenhouse serves as a substantial reservoir of liquid available to supply plants grown in the greenhouse. A fill port is provided for filling the reservoirs, and a drain port is provided for emptying the reservoirs. Once drained, the entire frame, as it is constructed of light-weight material, is easily portable.

The lower compartment of the present invention forms a base platform for plant containers. Plant containers, such as flower pots, may be placed on the base platform. Connected to the base platform are tubular risers that are adapted to matingly fit into the plant containers placed on the base platform. The plant containers of the present invention are similarly adapted to make a mating connection with the tubular risers. Fitted in the tubular risers are wicks suited to facilitate capillary migration of liquid. This arrangement provides a flow-path which allows water or similar liquid to travel by capillary migration from the lower reservoir (specifically the tubular members of the base platform) through the wick fitted in the tubular risers and then into the soil in the plant container. By this means, plants growing in the greenhouse have a near constant source of liquid nutrients being supplied into the soil around the roots by capillary migration. The plant roots may thus draw upon these liquid nutrients when needed for plant health, while the limitations on capillary migration by soil saturation prevents over-watering.

Other objects, features and objectives of the invention will be found throughout the following description, drawings and the claims.

BRIEF DESCRIPTION OF THE DRAWINGS

For a more complete understanding of the features and advantages of the present invention, reference is now made to the detailed description of embodiments of the present invention, examples of which are illustrated in the accompanying drawings in which corresponding numerals in different figures refer to corresponding parts and in which.

DETAILED DESCRIPTION OF THE PREFERRED EMBODIMENT

Figure 1:
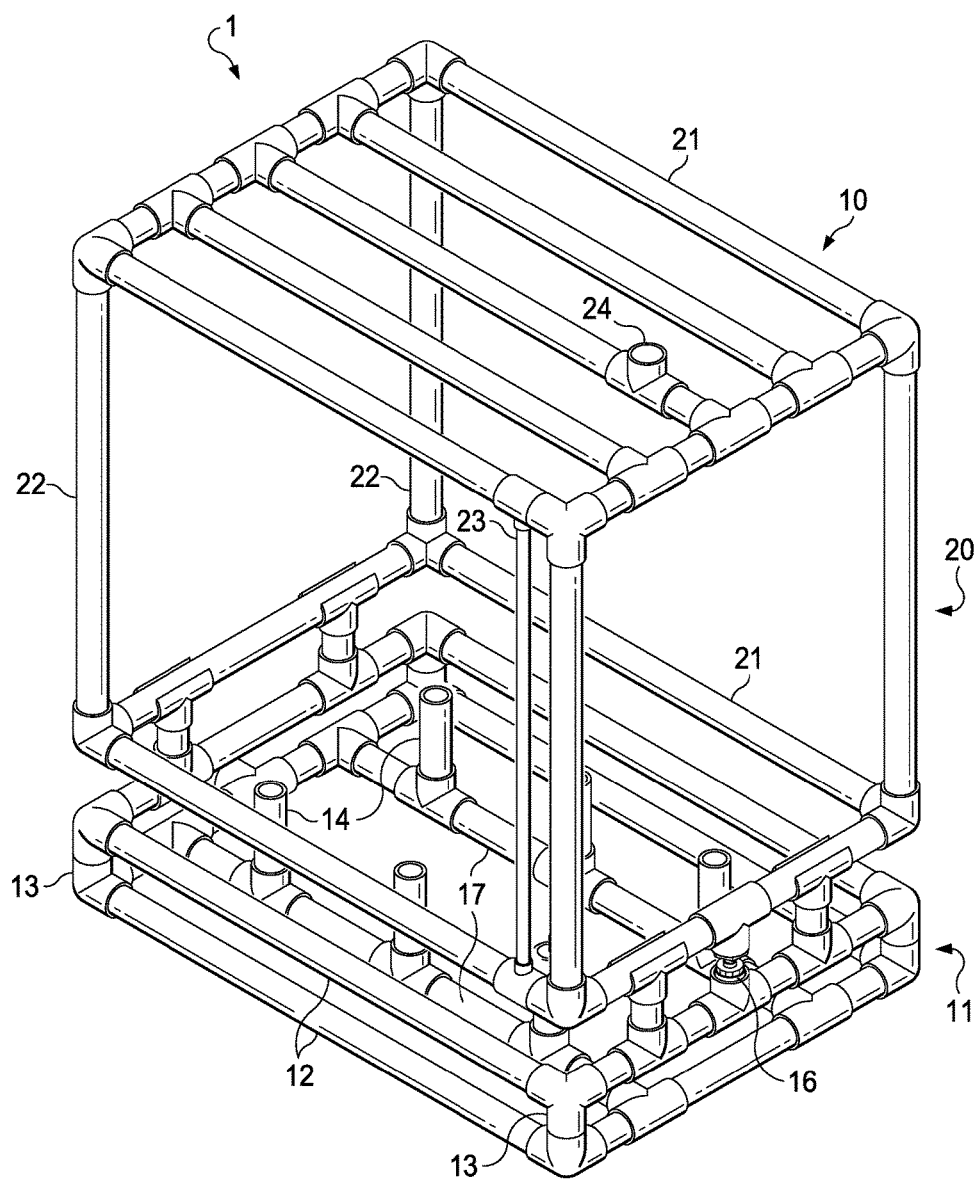
FIG. 1 is a partial front perspective view of a preferred embodiment of the apparatus of the present invention.

Illustrated in FIG. 1 is the self-watering portable greenhouse 1 of the present invention. Greenhouse 1 is comprised of frame 10, having lower compartment 11 and upper compartment 20. Frame 10 is constructed of light weight, water-tight tubular members suited to contain water or similar liquid. The tubular members of which frame 10 is constructed may be cylindrical, square, octagonal or other shape, but in the preferred embodiment the tubular members are cylindrical PVC piping. Lower compartment 11 and upper compartment 20 of frame 10 each forms a separate reservoir (an upper reservoir and a lower reservoir) for water or similar liquid that can be used as source of liquid nutrients for plants. Frame 10 is a unique combination that forms (1) two reservoirs of liquid nutrients, (2) a platform for plant containers, (3) tubular housings for wicks that are fitted into plant containers, and (4) a structural skeleton for exterior walls of the greenhouse. The structural skeleton may additionally serve to support a trellis hanging or placed immediately above the plant containers whereupon plants may climb or otherwise find support.

Figure 2:
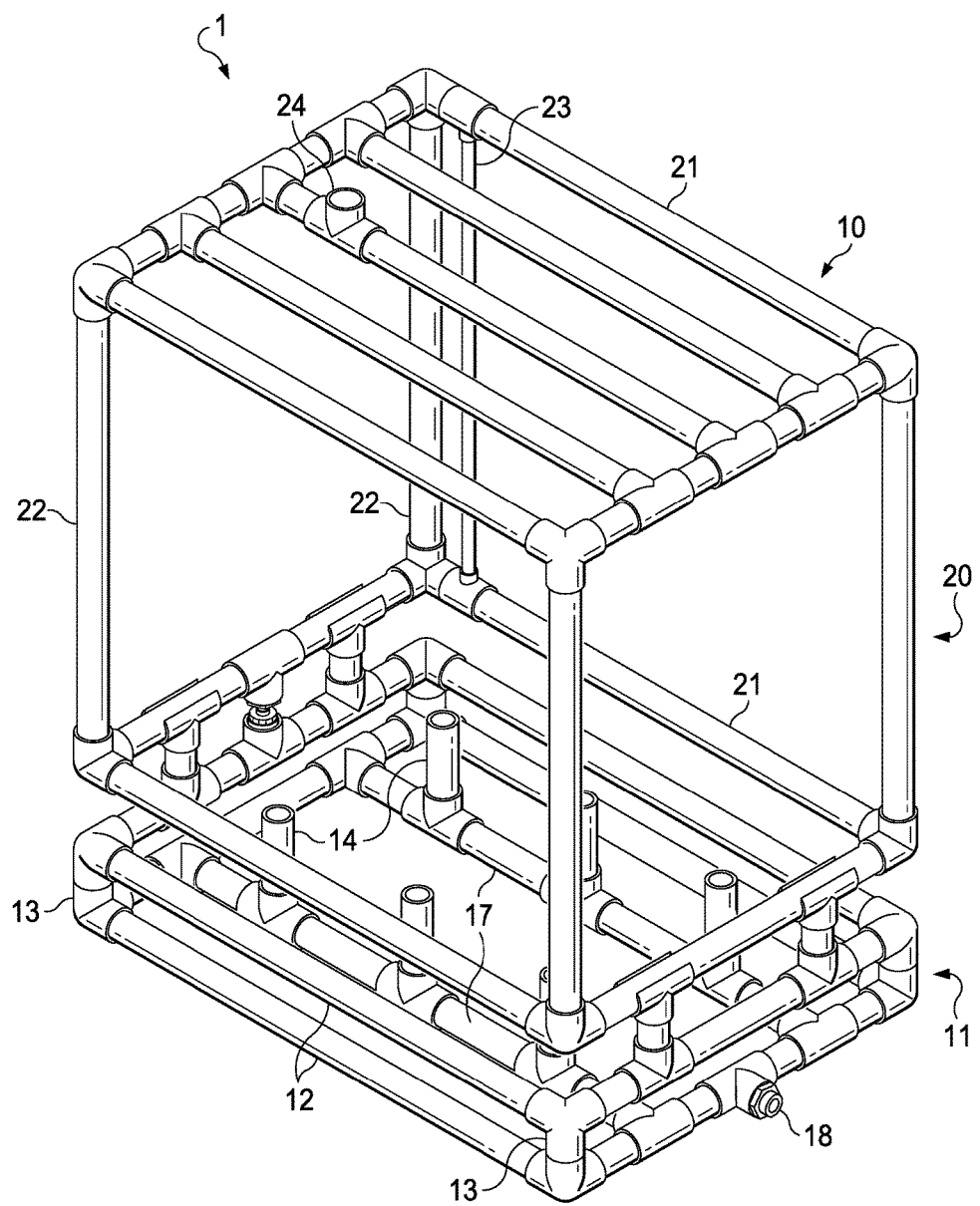
FIG. 2 is a partial back perspective view of a preferred embodiment of the apparatus of the present invention.

As seen in FIGS. 1-2, lower compartment 11 of frame 10 is comprised of lateral members 12, upright members 13, and tubular risers 14. Lateral members 12 and upright members 13 provide structural support for frame 10, form a perimeter for the lower compartment 11, and provide the lower part of the structural skeleton to support an exterior wall for greenhouse 1. Lateral members 12 additionally form base platform 17 that serves as a platform for plant containers 30 (seen in FIG. 3). Plant containers 30 may be placed on base platform 17 inside the perimeter of lower compartment 11. In this arrangement, a source of liquid nutrients (e.g., water inside lateral members 12 that form base platform 17) is strategically positioned below plant containers 30.

As seen in FIGS. 1-2, tubular risers 14 are connected to lateral members 12 at select locations along lateral members 12 that form base platform 17 inside the perimeter of lower compartment 11. The height of tubular risers 14 may be adapted relative to the height of lower compartment 11 such that the water weight in the lower reservoir will not force flow from the reservoir out of the tubular risers.

Figure 4:
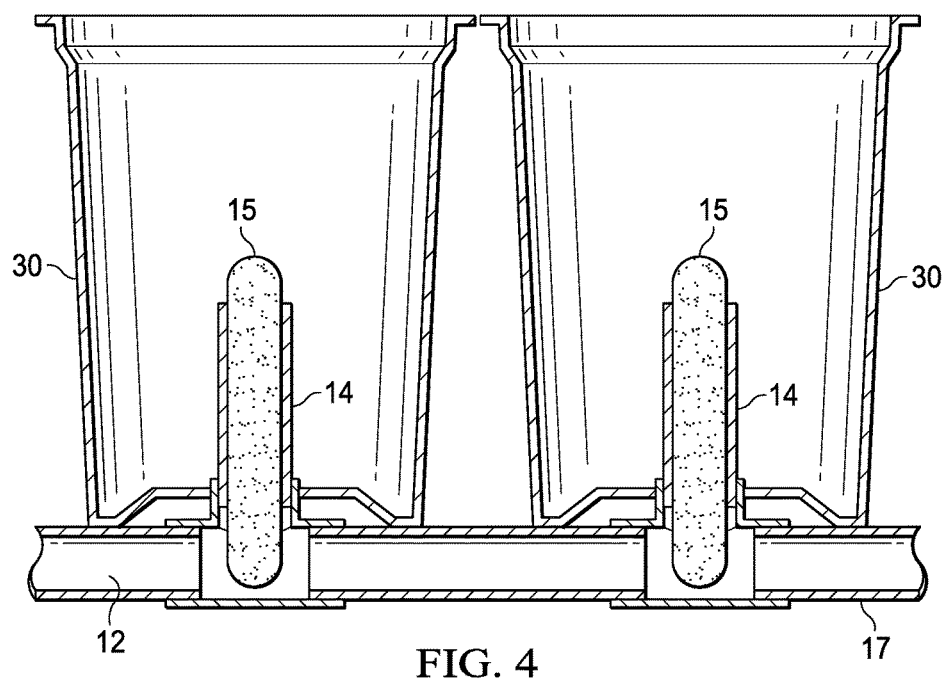
FIG. 4 is a fragmentary cross section view of a preferred embodiment of the apparatus of the present invention.

As seen in FIG. 4, tubular risers 14 of the present invention serve as sleeves suited to receive and position wicks 15 in fluid communication between the liquid in lateral members 12 that form base platform 17 of lower compartment 11 and the internal area of plant containers 30 where soil may be contained. Wicks 15 may be sized to matingly fit into tubular risers 14 and extend from the lateral members 12 that form base platform 17 through tubular risers 14 into the interior space of plant containers 30. Wicks of the present invention may be constructed of any semi-porous material suited to facilitate capillary migration of water or similar liquid. Appropriately sized wicks 15 fitted into the tubular risers 14 thus facilitate migration of water from the lower reservoir through wicks 15 and into the soil immediately surrounding the wick in plant containers 30.

Plant containers 30 of the present invention may be any desirable size and shape suited to contain soil or similar nutrient medium for plants. As seen in FIG. 4, each plant container 30 will have a bottom portion having an opening sized to matingly fit over a tubular riser 14 on base platform 17 of lower compartment 11. With plant containers 30 adapted to matingly fit tubular risers 14 with said plant containers placed on base platform 17, tubular risers 14 may be inserted into plant containers 30. In such arrangement, tubular risers 14 provide a fluid connection between the lower reservoir and the plant containers.

Figure 3:
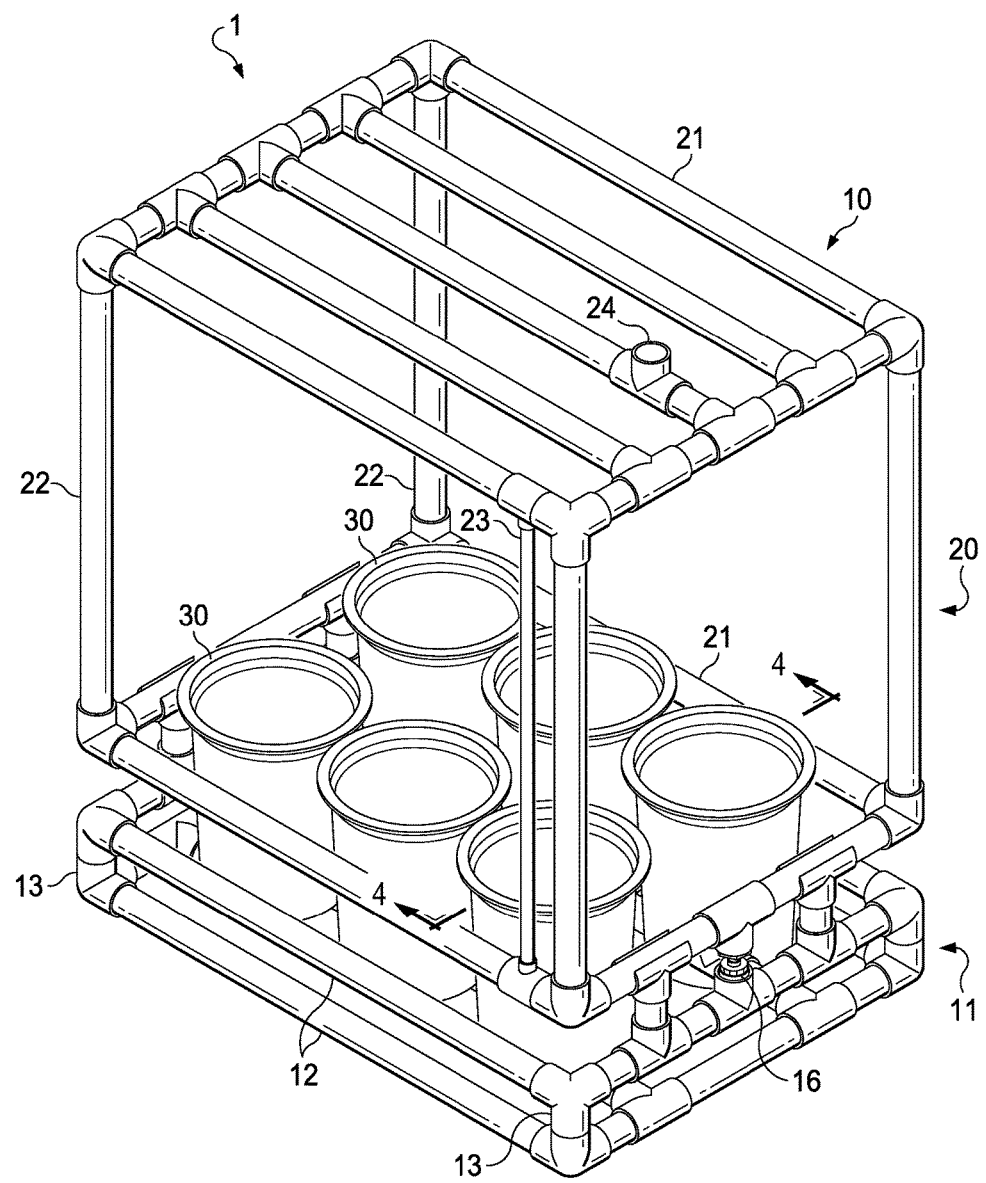
FIG. 3 is a front perspective view of a preferred embodiment of the present invention, shown without exterior walls in accordance with an embodiment of the present invention.

Upper compartment 20 of frame 10 is constructed of tubular members and may be made into any desirable shape that will accommodate liquid flowing from the upper reservoir through a valve and into the lower reservoir. As seen in FIGS. 1-3, In the preferred embodiment, the upper compartment 20 is rectangular in shape having horizontal members 21 and vertical members 22. Upper compartment 20 serves as the upper reservoir in the present invention, while also serving, by means of horizontal members 21 and vertical members 22, as a structural skeleton suited to support exterior walls for greenhouse 1.

As seen in FIG. 1 and FIG. 3 lower compartment 11 and upper compartment 20 of frame 10 are fluidly connected by float valve 16 which regulates liquid flow from the upper compartment 20 into the lower compartment 11. In an open position, float valve 16 allows water to flow by gravitational force from the upper compartment 20 into the lower compartment 11. When liquid in lower compartment 11 rises to a preset level, float valve 16 detects that level and actuates to close and thereby prevent further liquid flow from upper compartment 20 into the lower compartment 11. Float valve 16 of the present invention may be any commercially available float valve adapted to hold water in an upper reservoir until water level in a lower reservoir reaches a preset point. Such valve may have a housing, a water inlet with an inlet port, a float able to rise and fall with the level of the water in the housing, a valve operating mechanism able to open and close the port, and an actuator means to operate the valve operating mechanism when the float rises and falls to predetermined levels. For opening and closing the inlet port, there may be a valve operating mechanism comprising a valve operator having a valve member and a lever mounted for pivoting movement about a generally central pivot point. An actuator means may be coupled to the float to switch between a standby condition and an active condition respectively to the closed and open positions of the valve operating mechanism.

Figure 5:
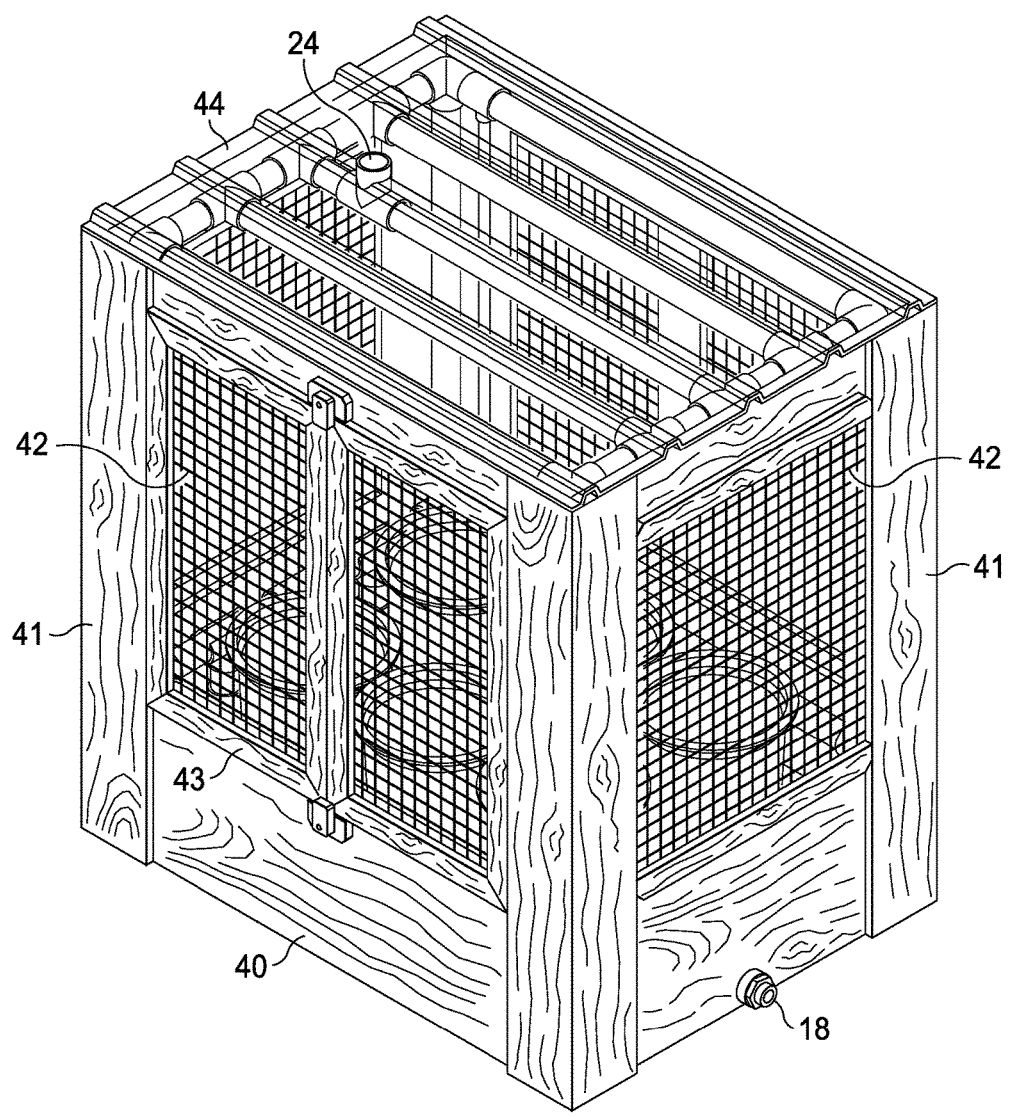
FIG. 5 is a back perspective view of a preferred embodiment of the present invention, shown with exterior walls in accordance with an embodiment of the present invention.

As seen in FIG. 2 and FIG. 5, lower compartment 11 includes drain port 18 which is connectively placed in a lateral member 12 of lower compartment 11 to allow draining water from the reservoirs. Drain port 18 may be selectively placed on any of the lateral members 12 of lower compartment 11 as appropriate to permit draining water from the lower reservoir. Once drained of water, frame 10 is easily portable. As seen in FIGS. 1-3, upper compartment 20 includes water inlet port 24 which is connectively placed in a horizontal member 21 to allow filling the upper reservoir with liquid. Inlet port 24 may be selectively placed on upper compartment 20 at any desirable location suited to filling the upper reservoir to a desired volume level. A liquid level indicator may be placed in either the upper compartment 20 or the lower compartment 11 to provide growers a visual indication of the level of liquid in the reservoirs. As seen in FIGS. 1-3, in the preferred embodiment of the present invention, level indicator 23 is connected to upper compartment 20, selectively placed between two horizontal members 21.

Figure 6:
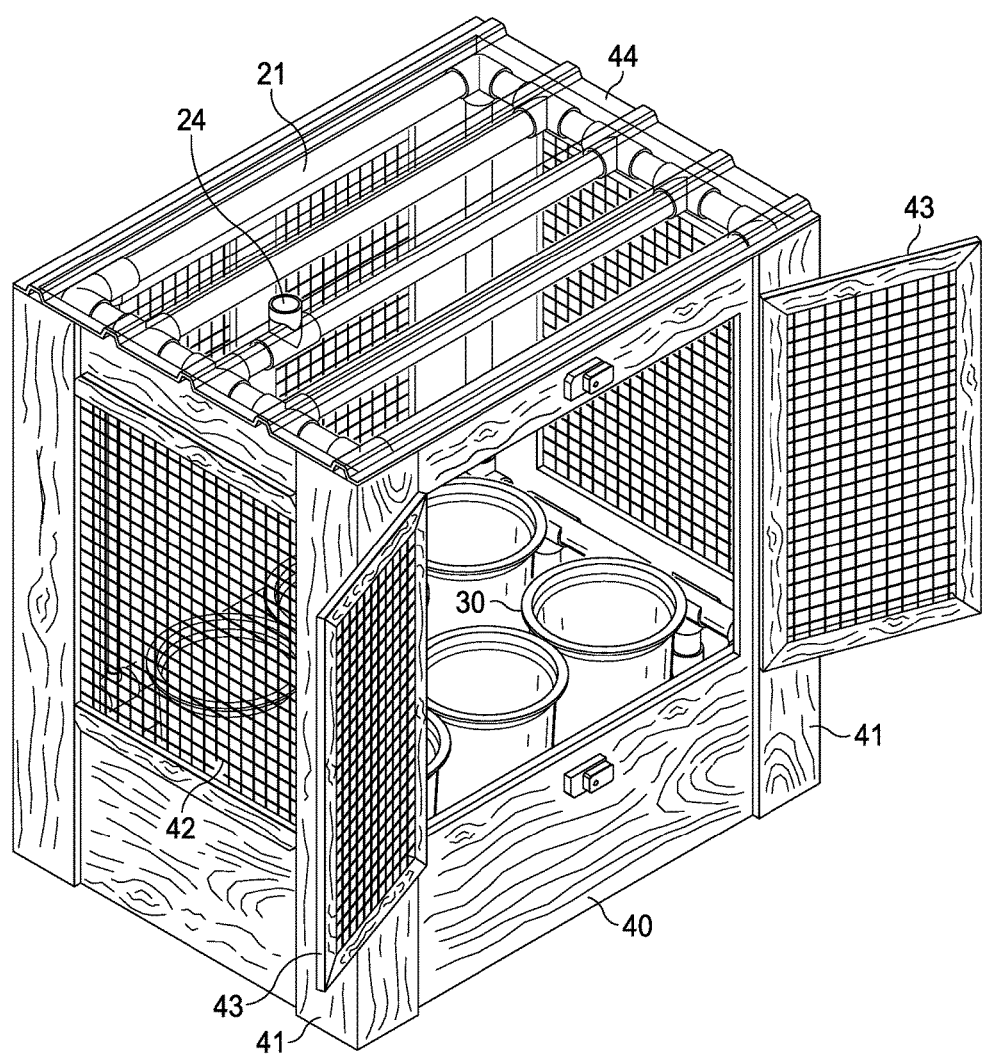
FIG. 6 is a front perspective view of a preferred embodiment of the present invention, shown with exterior walls in accordance with an embodiment of the present invention.

The present invention is suited to accommodate a variety of exterior wall coverings. An exterior wall covering may be chosen to suit the environment of the location where the greenhouse is kept. For example, if the greenhouse is kept on a patio in a temperate climate or during temperate season, the preferred exterior covering may be a netting material. Netting as an exterior covering would provide protection from animal intrusion while providing the greenhouse plants direct exposure to natural light. In harsh climates or seasons, the preferred exterior covering may be light-weight thermally insulated panels in combination with translucent roof panels. In the preferred embodiment, as seen in FIGS. 5-6, exterior wall covering 40 is comprised of light-weight cedar wall boards 41 with window openings 42, doors 43 and a roof of translucent polycarbonate panels 44. The preferred embodiment provides an easily assembled (and dis-assembled) free-standing box that covers the portable greenhouse while allowing sunlight into the greenhouse through translucent panels. The portable greenhouse of the present invention may easily be converted from summer patio garden to a winter patio garden simply by changing the exterior wall covering.

In an alternative embodiment, portable greenhouse 1 may be adapted to accommodate hydroponic gardening. In such alternative embodiment, plant containers 30 may be water-tight containers having a bottom portion with an opening sized and adapted to make a water-tight mating fit over tubular risers 14 in a water-tight arrangement. Plant containers 30 would then be suited to hold water or a combination of water and a non-organic medium, such as sand or rocks. In a hydroponic embodiment, a water pump (not shown) may be connected to drain port 18 whereby water in the lower reservoir (i.e. lower compartment 11) may be pumped through conveniently sized tubing from the lower reservoir to plant containers 30, where the water may be poured onto plants and sand or rocks in plant containers 30. Water not absorbed by the plants may then be channeled by gravitational force through tubular risers 14 into lower compartment 11, where it can be re-pumped from drain port 18 back through the same cycle.

While various embodiments of the invention have been described, the description is intended to be exemplary, rather than limiting and it will be apparent to those of ordinary skill in the art that other embodiments and implementations are possible that are within the scope of the invention. Accordingly, the invention is not to be restricted except in light of the attached claims and their equivalents.

The invention claimed is:

1. A portable, self-watering greenhouse comprising:
    a frame constructed of water-tight tubular members to form a liquid reservoir, said frame comprising:
        a lower frame portion having a plurality of lower frame upright members connected to a plurality of lower frame lateral members, with at least one of said plurality of lower frame lateral members positioned to form a base platform for plant containers, at least one tubular riser connected to said at least one of said plurality of lower frame lateral members positioned to form a base platform for plant containers, and at least one drain port connected to one of said plurality of lower frame lateral members;
        an upper frame portion having a plurality of upper frame vertical members connected to a plurality of upper frame horizontal members, and at least one water fill port connected to one of said plurality of upper frame horizontal members;
    a water level indicator;
    at least one float valve connectingly positioned between the lower frame portion and the upper frame portion of said frame;
    at least one wick fittingly connected to said at least one tubular riser, said at least one wick being adapted to facilitate capillary migration of liquid, and said at least one wick being further adapted to extend from said tubular riser; and
    at least one plant container having a container side portion and a container bottom portion, with said container bottom portion having an opening sized to matingly connect to said at least one tubular riser.

2. The portable, self-watering greenhouse of claim 1 wherein the water level indicator is connected to the upper frame portion of said frame.

3. The portable, self-watering greenhouse of claim 1 wherein the water level indicator is connected to the lower frame portion of said frame.

4. A portable, self-watering greenhouse comprising:
    a frame constructed of water-tight tubular members to form a liquid reservoir, said frame comprising:
        a lower frame portion having a plurality of lower frame upright members connected to a plurality of lower frame lateral members, with at least one of said plurality of lower frame lateral members positioned to form a base platform for plant containers, at least one tubular riser connected to said at least one of said plurality of lower frame lateral members positioned to form a base platform for plant containers, and at least one drain port connected to one of said plurality of lower frame lateral members;
        an upper frame portion having a plurality of upper frame vertical members connected to a plurality of upper frame horizontal members, and at least one water fill port connected to one of said plurality of upper frame horizontal members;
    a water level indicator;
    at least one float valve connectingly positioned between said lower frame portion and said upper frame portion of said frame;
    at least one wick fittingly connected to said at least one tubular riser, said at least one wick being adapted to extend from said tubular riser, and said at least one wick being adapted to facilitate capillary migration of liquid;
    at least one plant container having a container side portion and a container bottom portion, with said container bottom portion having an opening sized to matingly connect to said at least one tubular riser; and
    an external covering attached to said frame.

5. The portable, self-watering greenhouse of claim 2 wherein the water level indicator is connected to the upper frame portion of said frame.

6. The portable, self-watering greenhouse of claim 2 wherein the water level indicator is connected to the lower frame portion of said frame.

7. The portable, self-watering greenhouse of claim 2 wherein the external covering is netting.

8. The portable, self-watering greenhouse of claim 2 wherein the external covering is comprised of cedar side panels and a translucent top panel.

9. A portable, self-watering greenhouse comprising:
- a frame constructed of water-tight tubular members to form a liquid reservoir, said frame comprising:
  - a lower frame portion having a plurality of lower frame upright members connected to a plurality of lower frame lateral members, with at least one of said plurality of lower frame lateral members positioned to form a base platform for plant containers, at least one tubular riser connected to said at least one of said plurality of lower frame lateral members positioned to form a base platform for plant containers, and at least one drain port connected to one of said plurality of lower frame lateral members;
  - an upper frame portion having a plurality of upper frame vertical members connected to a plurality of upper frame horizontal members, and at least one water fill port connected to one of said plurality of upper frame horizontal members;
- a water level indicator;
- at least one float valve connectingly positioned between said lower frame portion and said upper frame portion of said frame;
- at least one wick fittingly connected to said at least one tubular riser, said at least one wick being adapted to extend from said tubular riser, and said at least one wick being adapted to facilitate capillary migration of liquid;
- at least one plant container having a container side portion and a container bottom portion, with said container bottom portion having an opening sized to matingly connect to said at least one tubular riser;
- an external covering fitted to attach to said frame, said external covering having side panels and a translucent roof panel.

10. The portable, self-watering greenhouse of claim 3 wherein the water level indicator is connected to the upper frame portion of said frame.

11. The portable, self-watering greenhouse of claim 3 wherein the water level indicator is connected to the lower frame portion of said frame.

* * * * *